(12) United States Patent
Labriola, II

(10) Patent No.: US 7,075,196 B1
(45) Date of Patent: Jul. 11, 2006

(54) INTEGRATED RESOLVER FOR HIGH POLE COUNT MOTORS

(75) Inventor: Donald P. Labriola, II, c/o QuickSilver Controls, Inc., 712 Arrow Grande Cir., Covina, CA (US) 91722

(73) Assignees: Quicksilver Controls, Inc., San Dimas, CA (US); Donald P. Labriola, II, San Dimas, CA (US)

( * ) Notice: Subject to any disclaimer, the term of this patent is extended or adjusted under 35 U.S.C. 154(b) by 0 days.

(21) Appl. No.: 10/217,744

(22) Filed: Aug. 13, 2002

(51) Int. Cl.
*H02K 4/00* (2006.01)

(52) U.S. Cl. .......................... 310/12; 310/13; 310/15; 310/65

(58) Field of Classification Search ................ 310/12, 310/68 B, 13, 168, 166, 156.05, 15
See application file for complete search history.

(56) References Cited

U.S. PATENT DOCUMENTS

| | | | |
|---|---|---|---|
| 3,376,578 A | 4/1968 | Sawyer | |
| 4,025,810 A | 5/1977 | Field | |
| 4,687,961 A | 8/1987 | Horber | |
| 4,755,751 A | 7/1988 | Ray | |
| 4,772,815 A | 9/1988 | Harned et al. | |
| 4,823,062 A | 4/1989 | Hoffman et al. | |
| 4,870,358 A * | 9/1989 | Glaixe | 324/208 |
| 4,873,462 A | 10/1989 | Harned | |
| 4,910,475 A | 3/1990 | Lin | |
| 4,980,594 A | 12/1990 | Poro | |
| 5,091,665 A * | 2/1992 | Kelly | 310/12 |
| 5,160,886 A | 11/1992 | Carlen | |
| 5,250,889 A | 10/1993 | Ezuka | |
| 5,434,504 A | 7/1995 | Hollis et al. | |
| 5,486,731 A | 1/1996 | Masaki et al. | |
| 5,742,136 A * | 4/1998 | Ono | 318/135 |
| 5,763,976 A | 6/1998 | Huard | |
| 5,929,541 A * | 7/1999 | Naito | 310/12 |
| 6,091,170 A * | 7/2000 | Mayes | 310/68 B |
| 6,137,204 A | 10/2000 | Kuwahara | |
| 6,175,169 B1 | 1/2001 | Hollis, Jr. et al. | |
| 6,239,571 B1 | 5/2001 | Shimahara | |
| 6,414,909 B1 * | 7/2002 | Shimizu | 368/204 |
| 6,483,276 B1 * | 11/2002 | Shimizu | 322/24 |

OTHER PUBLICATIONS

Lutz Göbel, et al., "A Small Linear Stepper Motor—Construction and Control," Intelligent Motion, pp. 621-626, May 1996.

I. Boldea, et al., "Linear Electric Actuators and Generators," IEEE, pp. 1.1-1.5, 1997.

(Continued)

*Primary Examiner*—Darren Schuberg
*Assistant Examiner*—Iraj A. Mohandesi
(74) *Attorney, Agent, or Firm*—Hogan & Hartson L.L.P.

(57) ABSTRACT

An AC synchronous motor, also known as a stepper motor, uses its magnetics and drive coils to produce both motion and excitation for sets of position sensing coils. Each drive phase is equipped with one or more sensing coils, which may be differentially wound, with the coils configured to act as secondaries of a linear variable differential transformer (LVDT). The primary of the so-formed LVDT is the motor drive winding. The outputs from these coils are fed to a microprocessor or DSP through an internal or external A/D converter. The microprocessor or DSP decodes the measured voltages using resolver strategies to produce a position measurement. An alternate mode of operation uses these same coils to form a variable reluctance resolver. This alternative mode of operation could be used for sensing coarse position while the motor drive is not energized.

6 Claims, 11 Drawing Sheets

OTHER PUBLICATIONS

S. J. Bailey, "Incremental Servos for Digital System Compatibility," Control Engineering, pp. 48-52, Jan. 1975.

Dan Jones, "The Sensorimotor a New Motor Technology," Circle Reader Service No. 180, pp. 40-41, Feb. 1986.

Motion Control New Digest, "Windings Give Rotor Position Feedback in New BLDC Motors," pp. 15-16, Nov. 1987.

David L. Kruse, "High Performance BLDC/Stepper Motor Controller Doesn't Need Encoder," PCIM, pp. 12-18, Feb. 1994.

Ralph Horber, "Sensorimotor: P.M. Synchronous Motor with Fully Integrated Position Sensor," Integrated Engineering Software, pp. 1-8, 1996.

* cited by examiner

INTEGRATED RESOLVER FOR HIGH POLE COUNT MOTORS

BACKGROUND

1. Field of the Invention

This invention relates to a motor having a resolver for detecting a position, velocity or acceleration that is determined by the motor and in a specific application, to such a motor associated with a control system that uses the position, velocity or acceleration in controlling the motor.

2. Description of the Related Art

Motors are used in a variety of applications for effecting the controlled motion of objects. For example, motors are used in a variety of industrial automation and other automation applications. In many applications, it is useful to provide the motor or the motor's controller with an accurate measure of the motor position to allow for greater precision in positioning objects with the motor. In other applications, it is useful to provide the motor or its controller with an accurate measure of the velocity or acceleration of the motor's rotor. Position, velocity and acceleration information can be useful however a motor is used, but one or more of these measures may be necessary when the motor is used in closed loop applications. In closed loop systems, one or more sensors collect position, velocity or acceleration information about a motor and provide that information to the motor controller. A closed-loop control system within the motor controller receives the motor position or other information as feedback and improves the accuracy of the positioning or movement characteristics of the motor. Motors whose operation is affected by feedback and under closed loop control are often referenced as servomotors.

To meet these needs, motors are often fitted with sensors that detect the position, velocity or acceleration of the motor. In most applications, only the motor position need be sensed as a function of time and other desired motor positioning characteristics can be derived from the relationship between the motor position and time. Two types of motor position sensors are likely the most prevalent in motors, encoders and resolvers. Encoders provide the motor with an indicator of motor position and a detector that detects changes in the positional relationship between the indicator and the detector. Indicators and encoders vary, but generally rigidly mount the indicator with respect to the rotor or shaft of the motor so that the indicator changes positions as the rotor and shaft change position. The detector is generally mounted in a fixed position, for example on the motor housing, and generally detects changes in the indicator position in a non-contact manner.

Encoder systems include those that use magnetic indicators and sensors and those that use capacitively coupled indicators and sensors. Presently prevalent systems use optical encoders to provide information about the change in motor position. Optical encoders typically affix a glass or other wheel to the motor rotor or shaft that has calibrated markings around the periphery of the wheel. The optical encoder further includes an optical sensor having a light source and a photodiode, with the light source and the photodiode positioned on opposite sides of the wheel so that rotation of the wheel causes the markings on the wheel to modulate the light path between the source and the photodiode. This modulation is detected and used to detect changes in the motor's position. Such an encoder can be used in the closed loop control of the motor and can be used to provide motor position information.

Encoders can provide accurate positioning and control information. On the other hand, encoders can be, an expensive component in that an encoder can be a major portion of the costs of a motor. Encoders require alignment and additional wiring and can add significantly to the assembly costs of a motor. Encoders also typically have a temperature range that is smaller than the temperature range of the motor to which they are attached, limiting the use of the motor to the smaller temperature range of the attached encoder. This can limit the power that can be practically achieved with the system due to the reduced temperature range. It would be desirable, for at least some motor applications, to provide a simpler or more cost effective strategy for measuring motor position or other motor characteristics.

Resolvers represent a different strategy for measuring the position and other movement characteristics of motors. Resolvers can be viewed as rotary transformers and generally have structures similar to motors. That is, resolvers include a rotating or otherwise moving rotor and a stationary stator. One or more coils are generally provided on the rotor and the stator, although this is not the only configuration known. The resolver rotor is attached to a shaft and generally one or more of the windings of the stator or rotor are driven with an alternating signal. Signals from the undriven coils are extracted and processed to yield position or velocity information about the shaft to which the rotor is coupled. As a general matter, resolvers are added to motors as distinct structures and so are not integrated with the electronics or magnetics of the motor. When a resolver is implemented as an add on to an existing motor structure, it increases the cost of the components of the motor and also increases the assembly costs for the motor.

There have been attempts to integrate a motor with a resolver. For example, U.S. Pat. No. 4,980,594 shows a combination servomotor and resolver. The design described in this patent is a complicated one that can be difficult to assemble. Windings are added to the stator and the rotor of the illustrated servomotor. A rotary transformer couples an excitation signal to the resolver coils on the rotor; that signal is detected and read from the resolver coils of the stator. Because drive signals need to be provided to the rotor, it is necessary to provide an inductive coupling, a slip ring coupling or other technique for coupling the signals to the rotating body. Generally such contacts are difficult to make and can be unreliable. The driving signal applied to the rotor is generated by additional electronics that are not normally used or present in the motor drive electronics.

Aspects of the present invention are discussed in terms of a synchronous, high pole count motor. Such motors are sometimes referenced as stepper motors and can be operated either in an open loop configuration or in a closed loop configuration such the stepper motor can also be operated as a servomotor. High pole count synchronous motors have certain properties that are used advantageously in some implementations of the present invention. U.S. Pat. No. 4,025,810 entitled "Low Noise Synchronous Motors" describes basic aspects of the configuration and operation of a stepper motor that are useful to this discussion.

FIG. 1 shows a view of a rotary stepper motor in cross section that is simplified from that described in U.S. Pat. No. 4,025,810. Referring to FIG. 1, the motor 10 has a central shaft 12 extending through a rotor 14. The rotor 14 includes a central permanent magnet 16, 18 magnetized in a vertical direction as shown in FIG. 1. For discussion purposes, the upper portion 16 of the permanent magnet can be taken as the north pole and the lower portion 18 can be taken as the south pole. Pole caps or pole pieces 20, 22 are positioned over the ends of the central permanent magnet 16, 18, respectively. The pole caps 20, 22 are made of a high permeability material through which the magnetic field of the permanent magnet 16, 18 passes readily. The magnetic field from the permanent magnet couples through the respective north and south pole caps 20, 22 and through the stator that encircles the rotor 14. FIG. 1 schematically shows that there are teeth 26 on the outer periphery of the rotor cap piece 20 and teeth 28 on the inner periphery of the pole pieces of the stator 24. These teeth are somewhat like the teeth of a gear and are designed so that they can come into close alignment to provide low reluctance paths between the rotor and the stator.

FIG. 2 shows one cross-section through the upper portion of the FIG. 1 motor; FIG. 2 shows the teeth of the pole caps and the stator more clearly. Like structures are identified in FIG. 2 with the numerals introduced in FIG. 1 for ease in understanding the discussion. Thus, FIG. 2 shows in cross section the shaft 12 surrounded by the north pole portion 16 of the permanent magnet. Pole cap 20 is shown in the cross section of FIG. 2 as a ring around the permanent magnet, with teeth 26 arranged on the outer cylindrical surface of the pole cap. Because the pole cap is a high permeability material, the teeth 26 and the other teeth extending from the pole cap act as north poles of a permanent magnet. Stator 24 surrounds the rotor, with a continuous outer ring and eight pole pieces extending inward from the outer ring. Teeth 28 extend inwardly from the ends of the stator pole pieces. The pole pieces are wrapped with coils that can be energized to produce magnetic fields at the teeth 28. The coils can be wound around the stator pole pieces in different directions, depending on the number of phases used in the motor.

At the position 30 indicated in FIG. 2 (i.e., the nine o'clock position), the teeth 26 of the pole cap align with the teeth 28 on the pole piece of the stator. This is a minimum reluctance path between the rotor and the stator for magnetic fields. At the position 32 (i.e., the six o'clock position), the teeth of the rotor cap piece and the stator pole piece are maximally (½ tooth) out of alignment. This is a locally maximum reluctance path between the rotor and the stator.

FIG. 3 shows another view through the motor of FIG. 1, with most of the cross section of FIG. 2 shown, but with a cut away to show in part a cross section through the lower portion of the motor. In that cut out portion, this cross section showing the outer portion of the lower, south pole rotor cap 22. As shown in FIG. 1, stator pole pieces extend the height of the motor while the rotor cap pieces are separated. Thus the stator teeth extend continuously vertically along the inner periphery of the stator. The rotor pole caps are separate pieces and the teeth on the pole caps 20, 22 are misaligned with respect to each other by one half tooth. In other words, the south pole cap 22 is rotated by one half tooth with respect to the north pole cap. The consequence of this alignment is that, at the position 34 shown in FIG. 3, which is vertically aligned with the nine o'clock position 30 shown in FIG. 2, the teeth 36 on the south pole cap are maximally misaligned with the teeth 28 of the stator pole piece. Thus, while at this particular rotation this stator pole piece has a minimum reluctance path to the north pole rotor cap 20, the stator pole piece has a locally maximum reluctance path to the south pole cap 22.

SUMMARY OF THE PREFERRED EMBODIMENTS

An aspect of the present invention provides an integrated motor-position sensor. The motor has a rotor assembly including a cylindrical portion having an axis, the cylindrical portion has a plurality of peripherally-spaced radially-projecting rotor teeth. The motor also has a stator assembly coaxial with the rotor assembly and having a plurality of radially projecting stator poles, the stator poles each have a plurality of stator teeth projecting radially to a circle coaxial with the rotor assembly, and coils for electrically energizing the stator poles. A plurality of sensing coils are positioned to intercept the magnetic flux between a plurality of the stator poles and a plurality of rotor teeth.

Another aspect of the invention provides an integrated motor-position sensor including a motor comprising a rotor assembly including a cylindrical portion having an axis, the cylindrical portion having a plurality of peripherally-spaced radially-projecting rotor teeth. The motor also includes a stator assembly coaxial with the rotor assembly and having a plurality of radially projecting stator poles. The stator poles each have a plurality of stator teeth extending radially to a circle coaxial with the rotor assembly. The motor also includes a plurality of driver coils coupled to produce magnetic fields within the stator poles. A plurality of sensing coils are positioned within the motor to have varying inductance as a function of the reluctance between one or more of the stator poles and a plurality of rotor teeth assemblies.

Still another aspect of the invention provides an integrated motor-position sensor comprising a linear motor having a platen assembly including a planar portion having a plurality of evenly spaced linearly projected teeth, and a forcer assembly planarly spaced from with the platen assembly and having a plurality of linearly projecting forcer poles. The forcer poles each have a plurality of forcer teeth projecting parallel to the platen teeth. Coils are provided for energizing the forcer poles. A plurality of sensing coils are placed to intercept the magnetic flux between a plurality of the forcer poles and a plurality of platen teeth.

Yet another aspect of the invention provides a motor having first and second pole pieces on a first part of a motor. The first and second pole pieces have faces with respective sets of teeth spaced regularly on the respective faces of the first and second pole pieces. At least one motor coil is provided to at least in part effect motor motion between the first part of a motor and a second part of the motor when the at least one motor coil is driven. The teeth of the first and second pole pieces interact with corresponding sets of regularly spaced teeth on the second part of the motor when the at least one motor coil is driven. First and second sensing coils are coupled to the first and second pole pieces and arranged to detect changes in magnetic flux coupling between the teeth of the first pole piece and the second part of the motor, on the one hand, and between the teeth of the second pole piece and the second part of the motor, on the other hand.

In other alternate embodiments, the motor position information could be derived by directly or indirectly sensing the inductance of the motor driving coils themselves instead of introducing a second, dedicated set of sensing coils to detect the motor position information.

In still other aspects, the present invention may provide a motor having an integrated position sensor. The motor includes a rotor assembly including a cylindrical portion having an axis, the cylindrical portion having a plurality of peripherally-spaced, radially-projecting rotor teeth. The motor also includes a stator assembly coaxial with the rotor assembly having a plurality of radially projecting stator poles, the stator poles divided lengthwise into a plurality of sections, each section having its own winding. Connections are provided to one or more windings of the stator assembly provided so inductance variations of the one or more windings may be sensed to determine rotor position.

BRIEF DESCRIPTION OF THE DRAWINGS

FIG. 2 shows the phasing relationship of the teeth of the upper rotor cap and the teeth of the stator poles with teeth.

DETAILED DESCRIPTION OF THE PREFERRED EMBODIMENTS

Figure 1:
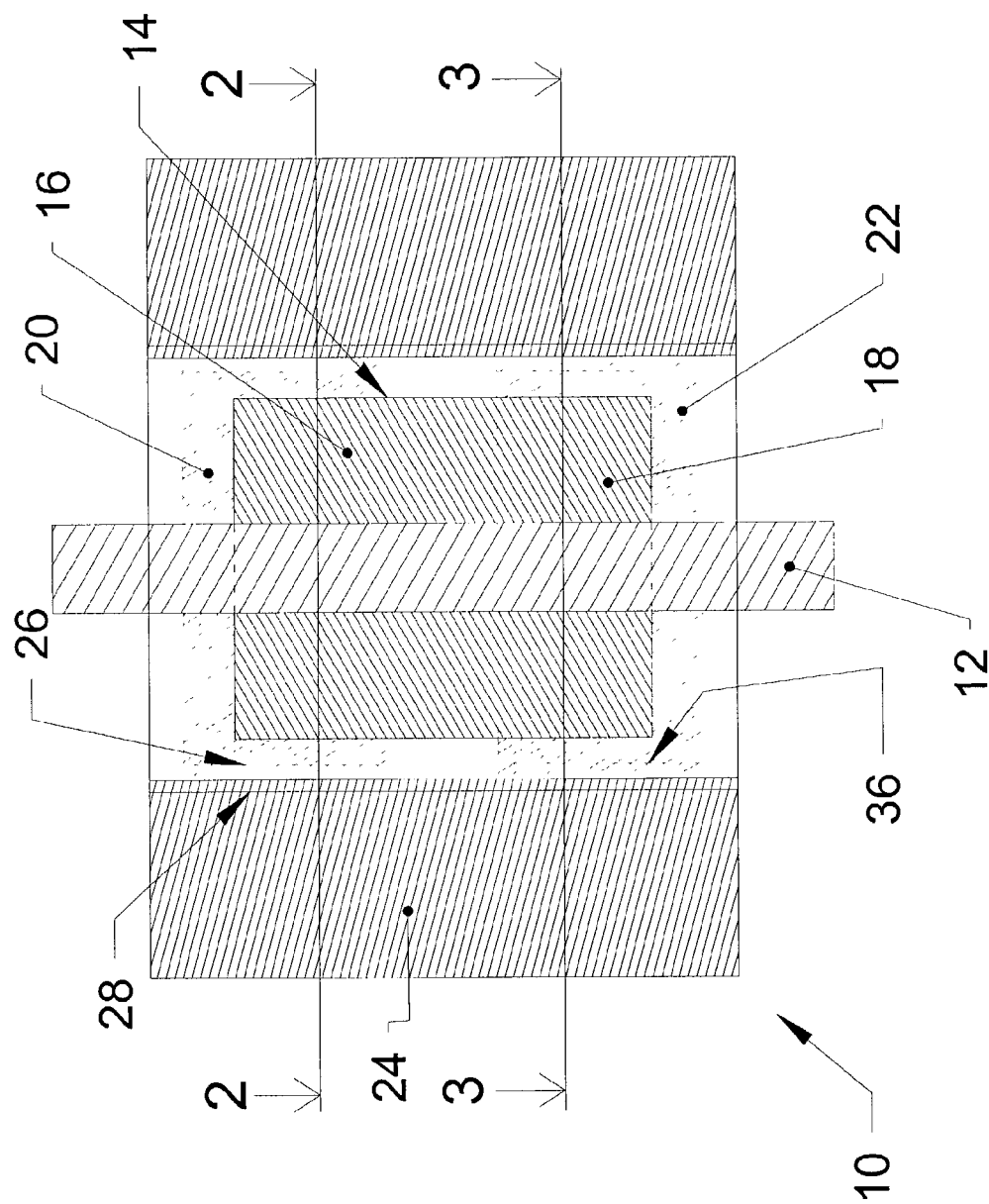
FIG. 1 shows a cross section through a rotary, high pole count, synchronous motor, a motor sometimes referred to as a stepper motor.

Preferred embodiments of the present invention provide a resolver integrated with a synchronous or stepper motor. Sensing coils are placed within the stator of such a motor to sense the varying levels of magnetic coupling between the rotor cap structures and the adjacent stator structures. Most preferably the sensing coils are integrated with the typical structure of a stator without altering the geometry of the motor or its operational characteristics. The magnetic structures that normally provide motion preferably determine the varying magnetic coupling as a function of rotor position that is detected by the sensing coils. Thus, additional driving circuitry and couplings are not generally required. Preferably, simple interface electronics and amplification are used to extract the position information from the sensing coils, such information typically being sampled and further processed by a microprocessor or a digital signal processor or other like circuitry. In this way, the integrated motor and resolver can provide position measurements without adding significant structures or complexity to a synchronous or stepper motor.

As mentioned, preferred embodiments of the present invention determine motor position from the varying levels of magnetic coupling between the complementary rotor cap structures and the stator structures. Appropriate motors may use one or more axially oriented permanent magnets fitted with two or more complementary rotor caps. These caps are disposed so that the teeth of the complementary rotor caps are offset with respect to each other generally by one half tooth so that, for a given stator tooth, the magnetic coupling to the two rotor caps will be 180 electrical degrees out of phase with each other. As is conventional, either the caps can be rotated with respect to the illustrated permanent magnet or the teeth in the stator can be rotated to achieve the same effect. Rotating the caps allows the same laminates to be used in creating the stator, which is generally preferred.

The position dependent coupling effects may be sensed either as variations in the reluctance of the respective magnetic paths or as a difference in coupling between the driven stator magnetics and the complementary stator caps, as picked up differentially by differential sensing coils. The latter sensing method essentially consists of multiple linear variable differential transformers with the primary coils being the stator drive coils and the secondary coils being sets of sense coils positioned to sense the flux through complementary tooth structures. The parameters sensed by this configuration vary approximately sinusoidally as the rotor moves through an electrical cycle. Electrical cycles, which are complete upon the passage of individual teeth of the stepper motor so that one half of a tooth is 180 electrical degrees, are to be distinguished from the physical motor cycles that require the rotation of the rotor through a cycle.

Typical implementations of synchronous or stepper motors may use different driving phases. The variation between these phases would commonly be either 90 degrees or 120 electrical degrees, although other motor configurations are easily accommodated. It is common to use two, three, four or five phase motors in light to medium duty positioning applications. Two coil sets or at least one set of differentially connected coils preferably are provided for each phase of the motor. In many instances it is preferred that sensing coils be provided for every stator pole piece. This provides a high level of information and, because sensing coils are provided on opposing stator pole pieces, allows for the subtraction of noise due to, for example, rotor eccentricities. Multiple sensor coils placed adjacent to multiple stator pole pieces provide phase-shifted versions of the integrated resolver's sine wave modulated output signals. The collection of signals, phase shifted and not phase shifted, identifies the rotor position with accuracy and may be decoded by typical resolver techniques to provide a position measurement.

As will be apparent from the following discussion, this strategy may be applied to either linear or rotary motor applications. In the rotary applications, the driven and sensing elements are associated with what is normally considered the stator, while in the linear motor, the platen usually forms the stationary element, with the driven element moving. Nothing about this strategy precludes reversing the roles of the stator and rotor in either the linear or rotary versions of this invention. For example, it is possible to provide a stepper motor that has wound driven and sensing coils on its rotor and a stator having a plurality of permanent magnets. This discussion is not intended to suggest that the roles of the stator/platen and rotor/driven elements could not be interchanged from the perspective of this sensing strategy for rotary and linear applications. Furthermore, the stator may be placed inside of a rotor, with the stator held in fixed position and the outside rotor displaced. Nevertheless, the presently described design does have advantages in the simplicity by which motor driving and position sensing signals can be coupled into and out of the motor.

What the sensing coils sense are the variations in the magnetic coupling caused by the motor's driven stator (or other) magnetic circuits. Depending on the position of the rotor with respect to the stator, the teeth of the rotor are either better aligned with the teeth of the top half of a given stator pole piece or with the teeth of the bottom half of that same stator pole piece. Flux is concentrated where the teeth are more aligned and that higher level of flux is coupled into the stator pole piece around which a loop of the sensing coil is wound. Conversely, there is lower flux where the teeth are less aligned and there is a higher reluctance between those rotor teeth and the stator. Lower flux is coupled into the stator pole piece. The sensing strategy directly senses these multiple components of the flux generated by driving the motor coils that is coupled to the rotor.

The one or more sensor coils are inherently aligned with the motor because they are physically wound around relevant portions of the stator and so can be used to determine a relative position between one of the stator pole pieces and the complementary rotor caps. The voltage across the coils is determined by the rate of change of the flux through the coil. The amount of flux going through the coil depends on where the teeth are aligned. From another perspective, the sensing strategy can be viewed as using a transformer that includes the two windings of the two sense coils, whether or not connected differentially, which are the secondaries of the transformer. The primary of the transformer is the driven motor coil. The changes in the respective flux paths between the primary and each of the two secondaries modulate the coupling between the primary and the secondaries.

Figure 2:
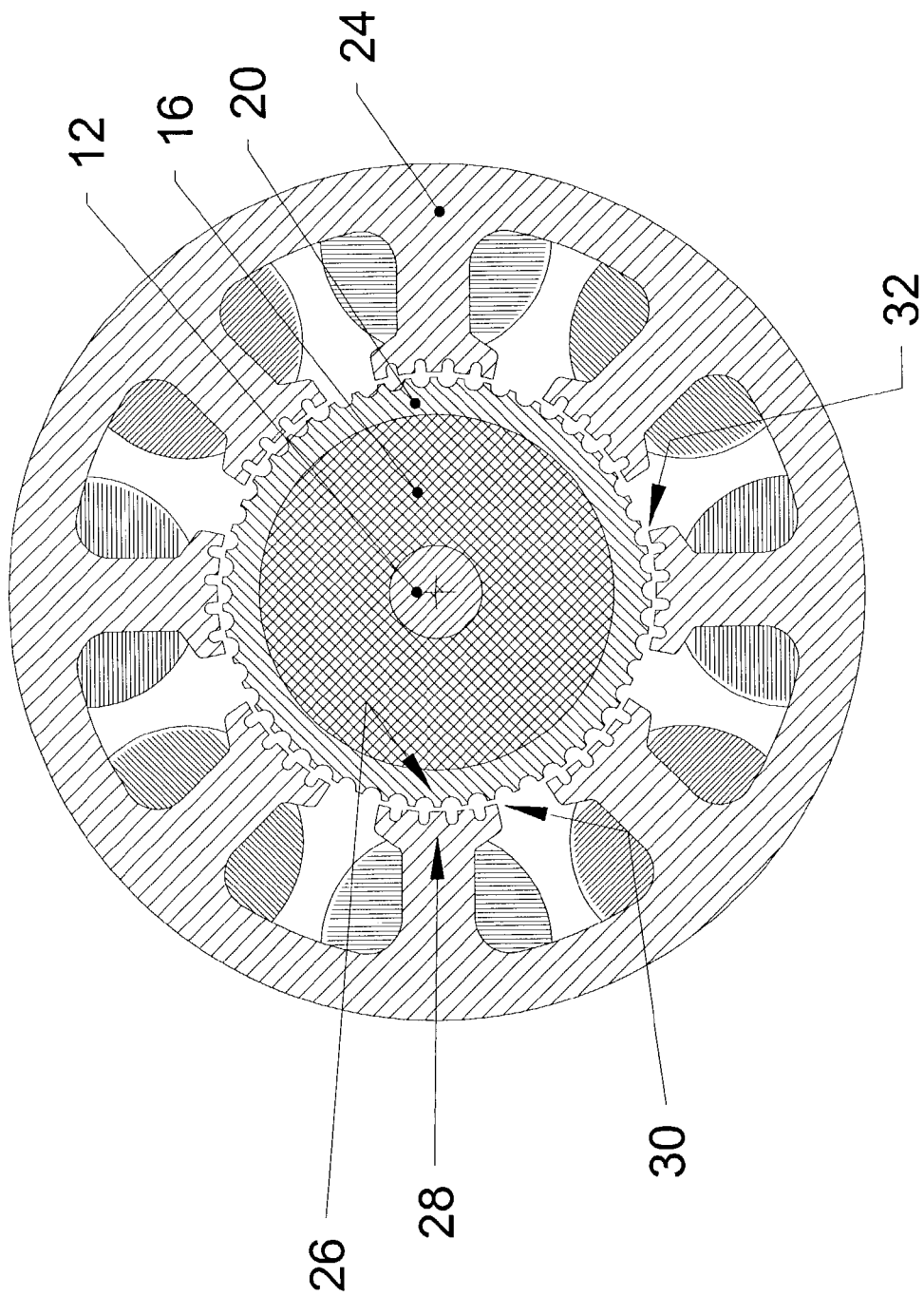
FIG. 2 shows the FIG. 1 motor in horizontal cross section through a rotor cap for a 1.8 degree stepper motor implementation.
Figure 3:
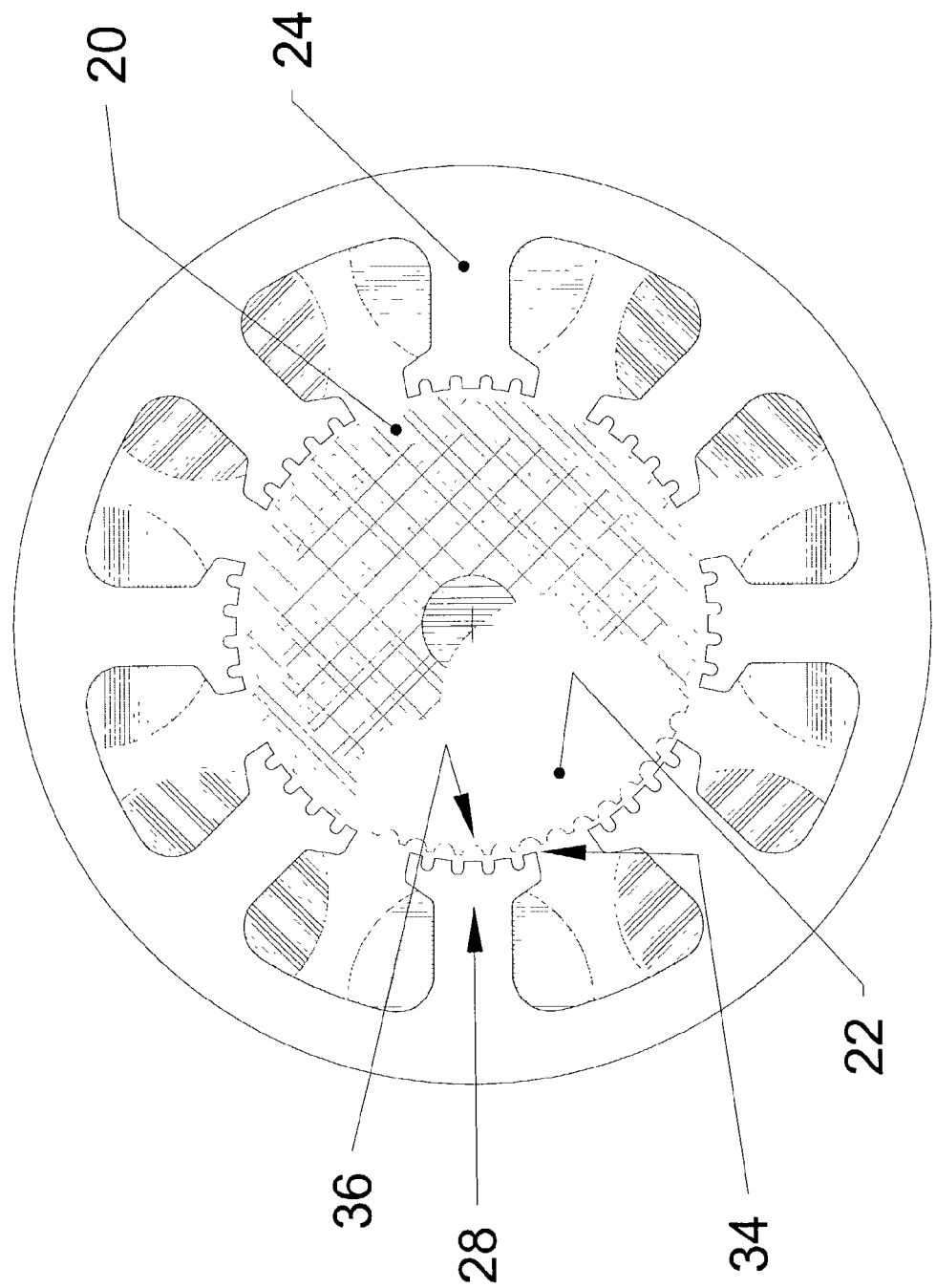
FIG. 3 shows the motor of FIG. 1 in horizontal cross section showing both rotor caps in cut-away. Note that the lower rotor cap has its teeth oriented 180 electrical degrees (½ tooth) from the upper rotor cap.
Figure 4:
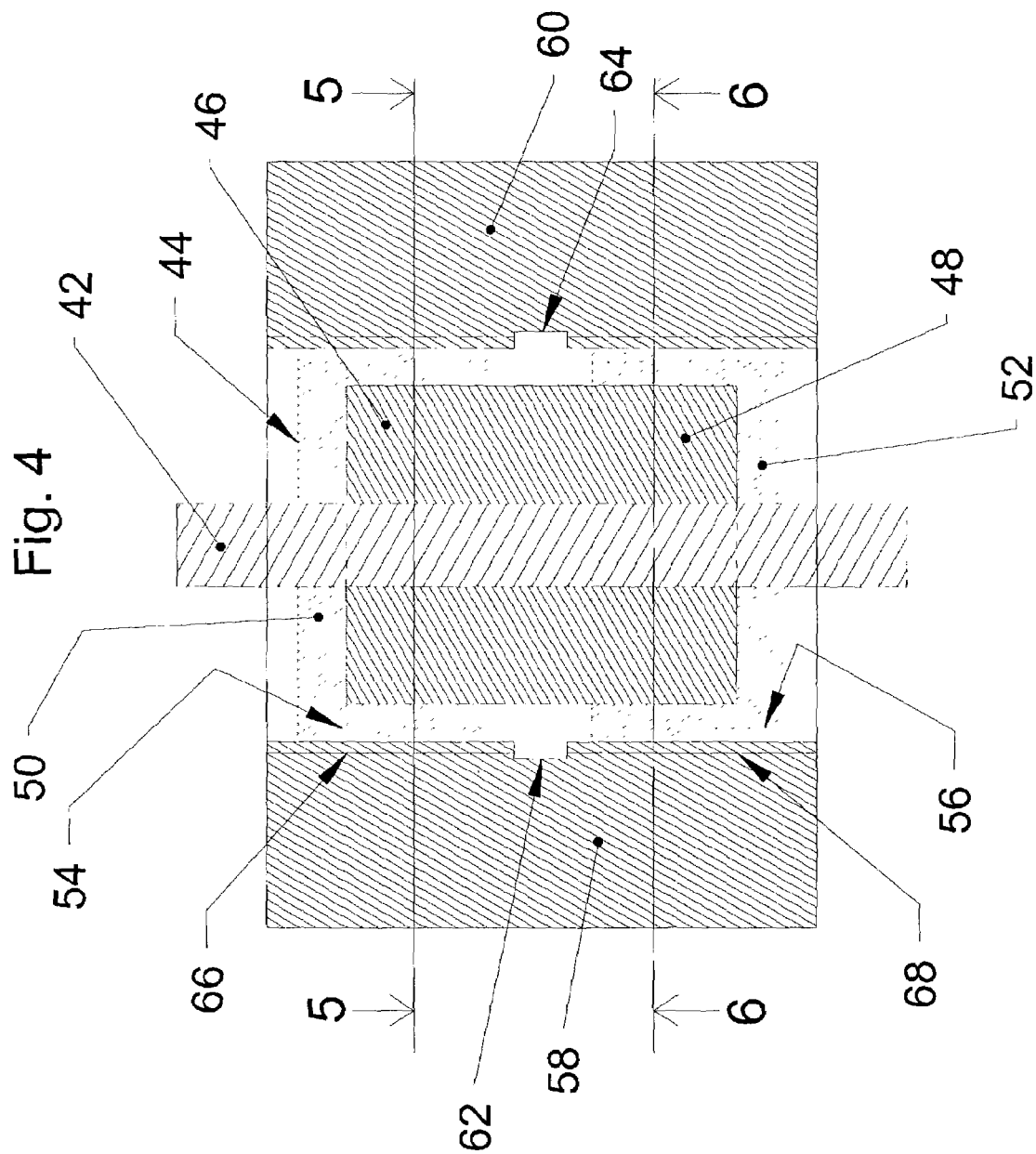
FIG. 4 shows a cross section through a rotary stepper motor in accordance with a preferred aspect of the present invention.
Figure 5:
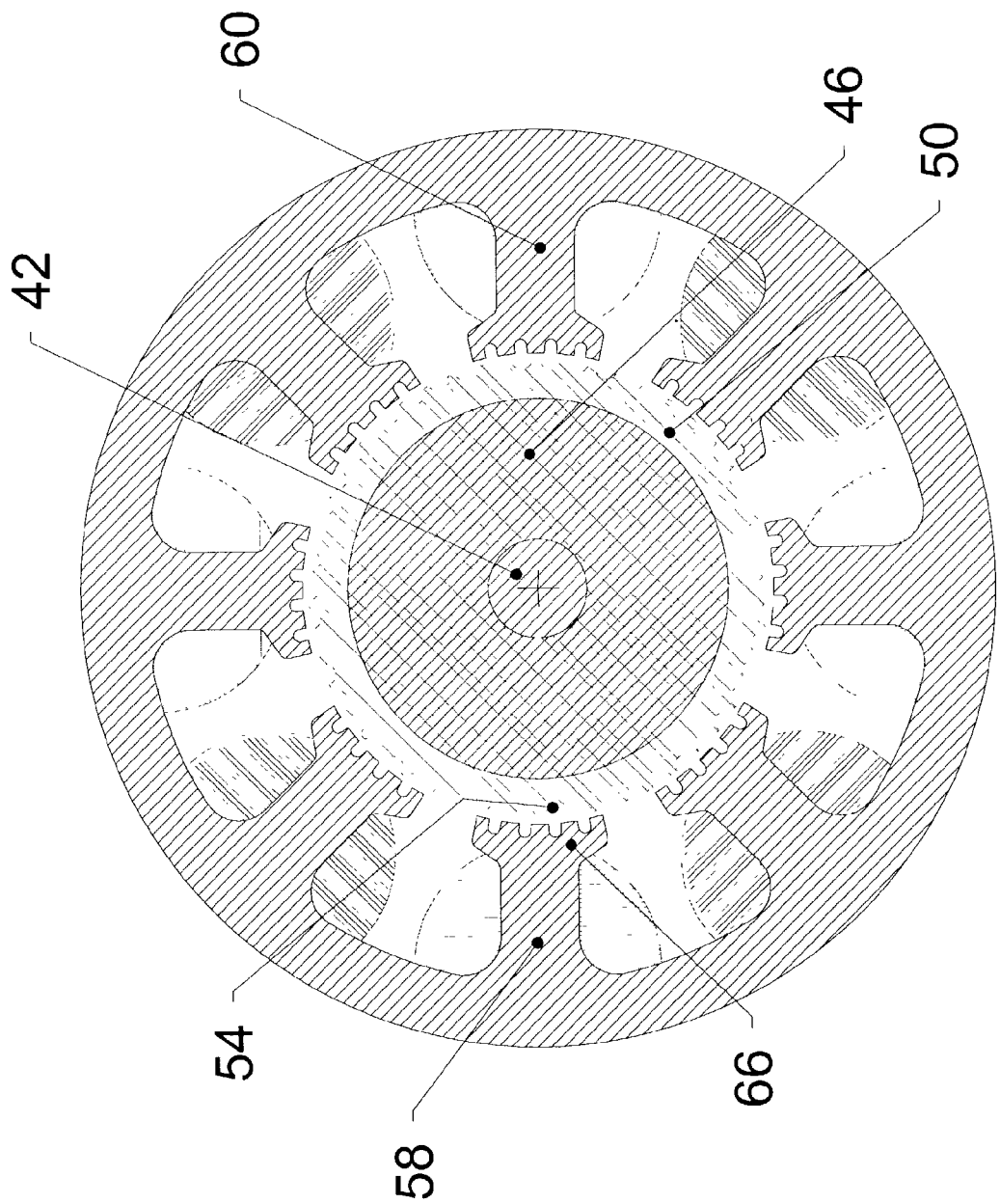
FIGS. 5 and 6 show horizontal cross sections through upper and lower rotor caps for a 1.8 degree stepper motor implementation of the FIG. 4 motor. Comparison between the FIG. 5 and FIG. 6 configurations shows the phasing relationship of the teeth of the upper rotor cap and the teeth of the lower rotor cap with the same teeth of the various stator poles. Note that the lower rotor cap has its teeth oriented 180 electrical degrees (½ tooth) from the upper rotor cap.
Figure 6:
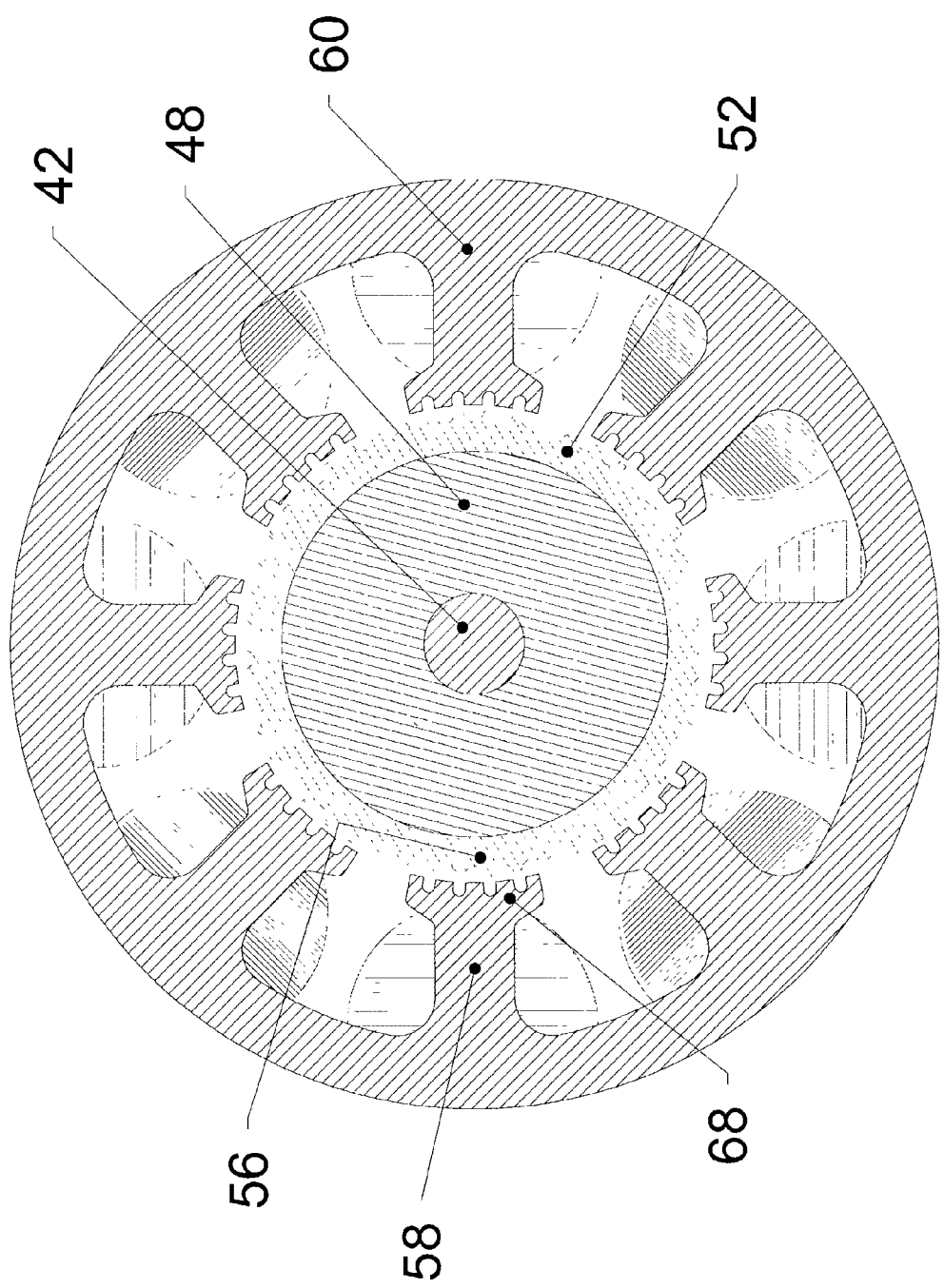

An implementation of the strategy is illustrated in FIGS. 4–6, which shows a high pole count, synchronous motor, often referred to as a stepper motor. The illustrated stepper motor is generally similar to that illustrated in FIGS. 1–3 above and so this discussion emphasizes the distinctions between this structure and that shown in FIGS. 1–3. FIG. 4 shows in cross section a rotary stepper motor 40 having a central shaft 42 extending through a rotor 44. The rotor 44 includes a central permanent magnet having north pole 46 and south pole 48. These orientations are provided only to simplify the discussion. North and south poles can be exchanged or more complex permanent magnet configurations can be used without altering the substance of how the strategy operates. Rotor caps or rotor pole pieces 50, 52 are positioned over the ends of the central permanent magnet 46, 48, respectively. The rotor caps 50, 52 have teeth 54, 56. The rotor caps 50, 52 typically are made of a high permeability material so that the magnetic field of the permanent magnet 46, 48 couples through the rotor caps and their teeth 56, 58 to the stator.

FIG. 4 shows in vertical cross-section two pole pieces 58, 60 of the stator of the FIG. 4 motor. In the illustrated embodiment, each of these stator pole pieces 58, 60 has a corresponding channel 62, 64 extending across the pole piece. Channels 62, 64 provide passage for either loops of a two coil sensing structure or for the passage of a portion of differentially connected coils. It is possible to route the sensing coils differently, but the illustrated strategy is particularly preferred as it is readily implemented and does not impair performance. Because channels 62, 64 do not face on rotor pole caps in the illustrated embodiment, cutting these channels does not alter the performance of the stator. The channel 62 separates the teeth of the stator pole piece 58 into upper teeth 66 that face the north pole cap 50 and lower teeth 68 that face the south pole cap 52. The two sets of teeth 66 and 68 remain aligned vertically in the illustrated preferred embodiment.

FIG. 5 shows one cross-section through the upper portion of the FIG. 4 motor; FIG. 6 shows a cross section through the lower portion of the FIG. 4 motor. Like structures are identified in FIGS. 5 and 6 with the numerals introduced in FIG. 4 for ease in understanding the discussion. What is significant in FIGS. 5 and 6 is that the rotor pole caps 50 and 52 are offset by one half tooth with respect to each other. The stator surrounds the rotor, with a continuous outer ring and eight pole pieces extending inward from the outer ring. Teeth 66, 68 extend inwardly from the ends of the stator pole piece 58. The pole pieces are wrapped with coils that can be energized to produce magnetic fields at the teeth 66, 68. The coils can be wound around the stator pole pieces in different directions, depending on the number of phases used in the motor.

At the stator pole piece 58 indicated in FIG. 5 (i.e., the nine o'clock position), the teeth 54 of the north pole cap 50 align with the teeth 66 on the upper portion of the pole piece 58 of the stator. This is a minimum reluctance path between the rotor and the stator for magnetic fields. Different levels of reluctance and magnetic coupling are apparent at the faces between the other stator pole pieces and the adjacent rotor teeth. Referring to FIG. 6, the same stator pole piece 58 (again, the nine o'clock position from this perspective), the teeth 68 on the lower portion of the stator pole piece 58 are maximally (½ tooth) out of alignment with the teeth 56 on the south pole rotor cap 52. This is a locally maximum reluctance path between the rotor and the stator.

One or more sensing coils are added to the permanent magnet (PM) stepper motor construction shown in FIGS. 4–6 to sense the relative portions of the magnetic flux from the driven coils in the stator that is coupled to the north (N) and south (S) pole caps of the rotor structure. These sensing coils may be, in a simple configuration shown in FIG. 7, two simple coils with one coil 70 over the upper portion of the stator pole piece 58 and a second coil 72 over the lower portion of the stator pole piece 58. Each of the coils passes through the channel 62 within the stator pole piece 58. The leads of the two coils 70, 72 are lead out of the motor along the side of the stator pole piece 58 and attached to appropriate interface circuitry to read out the signals. This illustration shows a single loop of wire in each coil, which in practice has been shown to provide a usable signal. More practical implementations might use twenty to thirty turns in each of the sensing coils.

Figure 7:
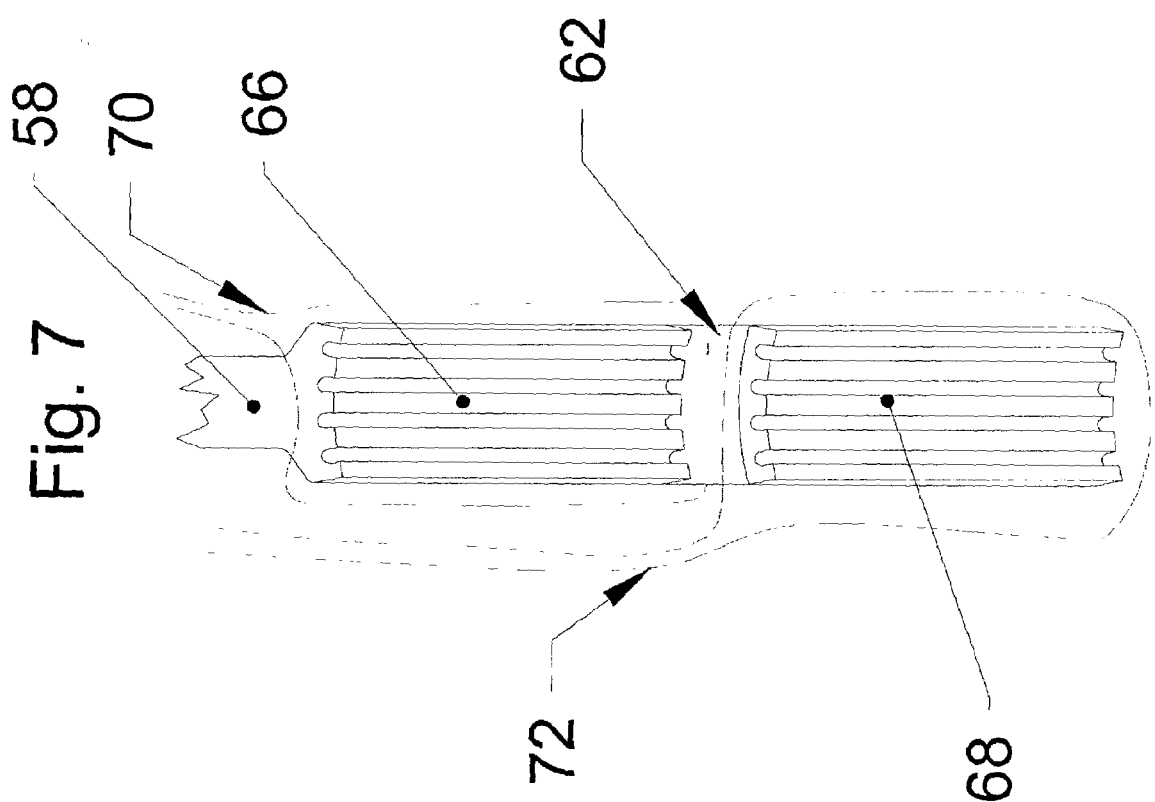
FIGS. 7 and 8 show exemplary winding placements for the sensing coils for a rotary stepper motor for a single phase of the illustrated motor. The sense windings may be brought out independently as in FIG. 7 or brought out in a differential configuration as in FIG. 8. Only a single pickup turn is shown for simplicity, although implementations could have many turns as appropriate to achieve desired signal levels.

In practice, a single set of sensing coils might be provided on a single stator pole piece to provide useful positioning information. More preferably, a set of coils is provided for each phase of the motor so that a set of coils is provided on a stator pole piece for each of the phases of the motor. In some implementations, sets of sensing coils might be provided on each of the stator pole pieces. Normally, at least two pieces of information—i.e., sensing sets—are needed to determine position. The two pieces of information could be from two of multiple phases but, as indicated, one coil per phase would be preferable. When multiple sets of coils are provided over multiple stator pole pieces, the signals from sense coils corresponding to each given motor phase are combined so as to maximize the detected signal while averaging out unwanted effects such as out of round effects. The use of independent coils (as illustrated by FIG. 7) allows the processing circuitry to determine the overall magnitude of the flux as well as changes in the flux, which may simplify or improve the accuracy of the algorithms for converting the resolver output to motor angle.

Alternatively, the sum and difference signals could be generated by placing sensing coils at the twelve o'clock and nine o'clock stator poles, for example, with the coupling between the upper pole piece to the rotor cap being maximum at nine o'clock and minimum at twelve o'clock when the rotor is positioned as shown. The operation is essentially the same as for having the complementary coils located on the same stator pole structure. When the multiple sets of coils are provided over multiple stator pole pieces, the signals from windings that simultaneously align preferably are brought out separately from those in alternate alignment. For example, the north sensing winding at twelve o'clock is preferably connected to the south sensing winding at nine o'clock to the north sensing winding at six o'clock and the south sensing winding at three o'clock. Their alternate pairs would similarly be interconnected.

Figure 8:
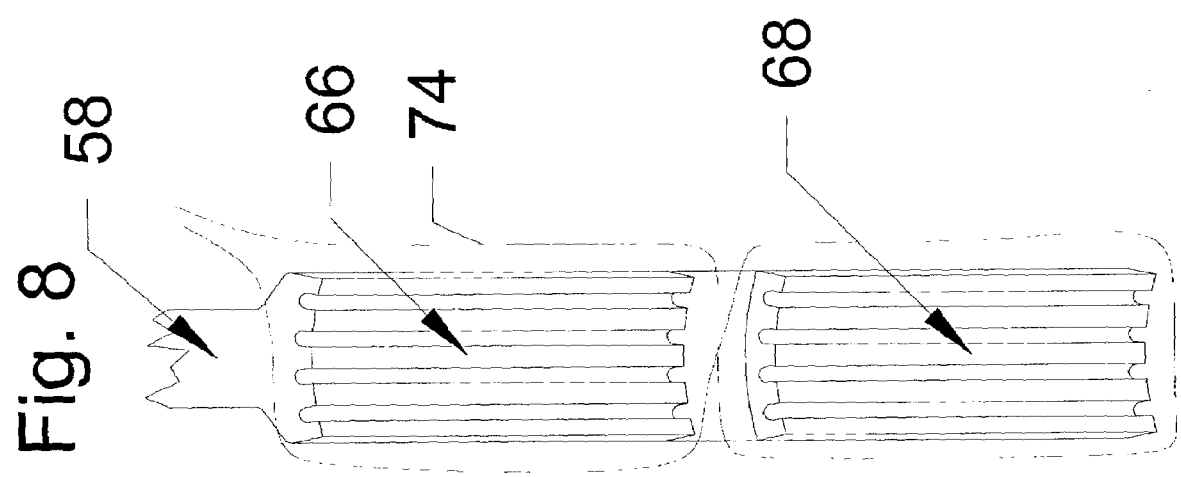

Another configuration of the sensing coils is shown in FIG. 8. FIG. 8 shows a "figure-8" configuration of sensing coils, which provides two coils connected in a differential configuration. One coil of the "figure 8" is wound over each portion of the stator pole. Preferably, distinct "figure 8" coils are provided over one stator pole piece for each of the phases of the motor. Similar to the discussion above, a more sophisticated and in many instances preferred implementation could provide sensing coils on additional stator poles to help minimize the effects of rotor run-out (out of center) that could modulate the sensed signals and so act as a noise source to the resolver. As with the discussion above, this illustration shows a single loop of wire for the "figure 8" coil. More practical implementations might use twenty to thirty turns in the differentially connected sensing coil. Regardless of whether the two coil or the "figure 8" coil configuration is used, the number of windings selected for the sensing coil is preferably sufficient to provide a sufficiently strong signal to be detectable over the noise floor and easily processed. Generally the number of coils should be limited so as to not impair motor performance, although this should not be a significant problem for the expected number of turns to be used in practical applications.

The reluctance from the teeth of the driven stator pole pieces to the teeth of the adjacent rotor pole pieces varies as a function of rotor position. The magnetic coupling between the teeth of the stator and the teeth of the rotor is maximum (reluctance minimum) for one of the rotor pole caps when its teeth align with the stator teeth. The magnetic coupling is simultaneously minimum at the opposite rotor pole cap because the teeth of the opposite rotor pole cap align with the gaps in the same stator pole. In this state, the voltage difference at the leads of the sensing coils will be a maximum. As the rotor rotates, the coupling between the first rotor pole cap and the stator decreases, while the coupling between the second rotor pole cap and the stator increases. At 90 electrical degree rotation (1.8 rotational degrees for a 100 pole/50 electrical cycle per mechanical cycle motor, also known as a 1.8 degree stepper), the coupling to both caps from the given stator pole is approximately equal, thus the difference voltage measured at the leads of the sensing coils is approximately zero. At the 180 electrical degree rotation point, the coupling between the second rotor pole cap and the stator is maximized, and the coupling between the first rotor pole cap and the stator is minimized, and so forth as the rotor rotates.

The sensing coils sense the relative magnetic flux coupling through these different reluctance paths so long as the sensing coils are positioned to independently intercept the two flux paths. This is easily done using the sensing coils illustrated in either of FIGS. 7 and 8. Additional sets of coils preferably are placed on one or more additional driven phases having different phasing relationships between the stator and rotor teeth. Each set of sensing coils, in combination with the driven coils of the stator, form a rotary linear variable differential transformer (LVDT). In this linear variable differential transformer, the motor drive coil is the primary and the sensing coils form the secondary coils. The use of multiple LVDT coil sets built on multiple stator phases produces the multiple phases of a resolver (though each with their own primary phase) that may be used to determine the rotor position within an electrical cycle. Processing of these signals to produce a position measurement is readily accomplished using conventional resolver techniques.

In the case of the two sensing coils for each phase having their leads brought out independently, these sensing coils could also be driven and their relative inductance measured. For this configuration the variation in inductance is caused by the variation in reluctance due to the relative positioning of the rotor and stator teeth. This configuration could provide a backup measurement of position when the motor driver is disabled, but need not be used or present in all implementations of this invention.

The illustrated implementation does not need a separate driver. For detecting the signals representative of the position from the sensing coils, preferred embodiments use a low power receiver, such as a low power op amp, to condition the signal and drive the signal into an A/D converter. The sensed signals are digitized in the A/D converter and are provided to a digital signal processor (DSP), which performs the familiar resolver-type calculations to extract the position information from the sensed signals. Typically one op amp is used for each sensing coil so that two op amps are provided for a configuration using two coils and a single op amp is used for a differential "figure 8" configuration. Other circuitry might alternately be used for the op amps and A/D converters of the preferred read out circuitry.

The voltages measured by the sensing coils have both the phase drive voltage and the back-emf signals mixed together. Taking difference measurements (as described below) of these signals easily separates the phase drive voltage and the back-emf signals. Using the gated antiphase driving strategy of U.S. Pat. No. 5,977,737, which patent is hereby incorporated by reference in its entirety, avoids this noise due to the back EMF of the motor. The portion of the sensed signal representative of the position is doubled if the reading is taken before and after the driving voltage is reversed. The gated antiphase driving of the motor coils switches driving direction between minus and plus during each electrical cycle and so provides this switching in the driving voltage.

Before energizing the primary stator driving coils, the preferred detection method in a motor utilizing the gated antiphase driving strategy reads the voltage at the leads of the sensing coils to eliminate any offset. Just before the voltage changes direction, the voltage induced in the sensing coils is measured and then the motor coils are driven in the reverse direction and the voltage of the leads of the sensing coils is measured again. The difference between the two readings maximizes the signal corresponding to the phase drive voltage component, while minimizing the back-emf component, as the back-emf component does not significantly change over the small time window between these two readings.

The switching of the motor driving voltage and the timing of the measurements of the induced voltage in the sensing coils gives an AC chopping effect, so that sampling is performed at a sufficiently high rate. More particularly, the sampling is done at approximately a 20 kHz to 50 kHz rate, with the separation between the first and second readings nominally one microsecond apart. Unwanted signals that change slowly with respect to the nominal one microsecond time interval are subtracted out. The wanted signals are intentionally varied in this time window to accentuate their measurement. This AC chopping effect also facilitates locking onto the induced voltage signal from the sensing coils.

Aspects of the integrated resolver provide advantages as compared to at least some encoders. No rotary transformer is needed for the integrated resolver. The integrated resolver and motor are automatically aligned, which stands in contrast to at least some encoders that require alignment. The combination of the integrated resolver and motor is able to achieve very good resolution even on very small diameter motors, as the resolution is dependent on the number of poles in the underlying motor and not on its diameter. Very small conventional resolvers are difficult to build due to the requirement that brushes or rotary transformers be used to couple signals to the rotor. Optical encoders more generally have difficulty in small diameter packages due to the limited circumference of the encoder disk limiting the number of optical lines that may be placed on the encoder disk. Also in contrast to at least some types of encoders, the integrated resolver and motor operates over the same thermal ranges as the motor, which is typically significantly wider than allowed for optical encoders.

Implementations of the integrated resolver and motor can have significant benefits. The cost of the system can be low. The position sensing system described here requires no magnetics in addition to those already present in the motor. Only small, lightweight and rugged pickup coils are added. There is no need for additional resolver driver circuitry and their attendant power consumption. The integrated resolver and motor provides dust and oil resistance, and does not use up either of the rotor shaft ends, which may be advantageous in some applications. An integrated resolver can also be used for motors having hollow rotors and lead screw nut combinations used to provide linear motion from a rotary motor. Not all of these advantages need be achieved in any given implementation of the present invention, but these various advantages are believed to be achievable through practice of aspects of the present invention.

Stepper motors/high pole count synchronous motors typical of the type discussed above are described in U.S. Pat. No. 4,025,810, and U.S. Pat. No. 4,910,475, which patents are hereby incorporated by reference in their entirety and especially for their teachings with respect to the configuration and operation of stepper motors. The high pole count synchronous motors described in those patents can be implemented with differing numbers of stator pole pieces and with different numbers of phases. There are many known improvements and modifications to the basic motor designs described in these patents and the sensors and sensing strategies described in this patent are readily applicable to such improved and modified motors.

Integrating the resolver described here with such compact motors provides a small motor with accurate position information that can be used in various ways, including in providing feedback for the closed loop control of the motor. The availability of physically small motors of this construction, combined with the ability to produce high resolution position feedback is particularly advantageous. The same high resolution is available even in smaller frame motors. By contrast, the small radius of an attached encoder for a physically small motor may limit the resolution to just hundreds of counts per revolution.

This position detection method does not require any motion at power application to determine synchronization, and it can remain functional down to zero speed. Thus the position detection method described here is distinct from the various back-emf sensing methods that are not normally adapted to function at zero motor speed. Back-emf sensing methods typically exhibit unacceptable drift and so are not generally acceptable for position detection.

Note that the use of micro-stepping variety of stepper motors, also known as prime ratio laminate, 48/50 or 50/52 etc. laminates, have a different tooth pitch for the rotor and stator. This difference in tooth pitch combined with the tooth profile design of both the rotor and the stator, provides for a sinusoidal variation in the magnetic coupling as a function of rotor position. Motors with matching rotor/stator tooth configurations produce more of a trapezoidal variation in coupling as a function of rotor position. The sinusoidal variation is the preferred embodiment, although the current invention is applicable to either configuration.

The strategy described here applies equally to linear stepping motors, as linear stepping motors are essentially "rolled out" rotary stepper motors. The position sensing strategy can be applied in a similar manner to X-Y stepping motors (platen-forcer systems), which generally can be viewed as combinations of linear stepping motors. Applying this position sensing strategy to linear motors is particularly advantageous because linear motors and X-Y motors often are provided without closed loop controls or only poor closed loop controls. In linear and X-Y stepper operations, the described sensing strategy is sufficient for closed loop operation, simplifying the operation of multiple forcers on a single platen. As with the rotary motor applications, the sensor and motor automatically stay aligned in the linear stepper motor application.

The linear stepper motor described here may be like those shown and described in "A Small Linear Stepper Motor—Construction and Control", Intelligent Motion—May 1996 proceedings, or as shown in the U.S. Pat. No. 3,735,231, which article and patent are hereby incorporated by reference in their entirety and especially for their teachings on the construction and operation of linear motors. Such linear motors are commonly used in open loop motion control applications or, with the addition of feedback, in closed loop applications. In open loop applications, the rotor can loose synchronism with the fields applied to the stator, causing the rotor to not reach the desired position and or speed. The position sensing method described here can be applied to linear motors to provide closed loop control of these motors without additional magnetics and little added complexity or weight. Moreover, the strategy described here provides improved reliability and accuracy as compared to techniques that use sensors, such as optical position sensors, added to the basic motor structure.

Figure 9:
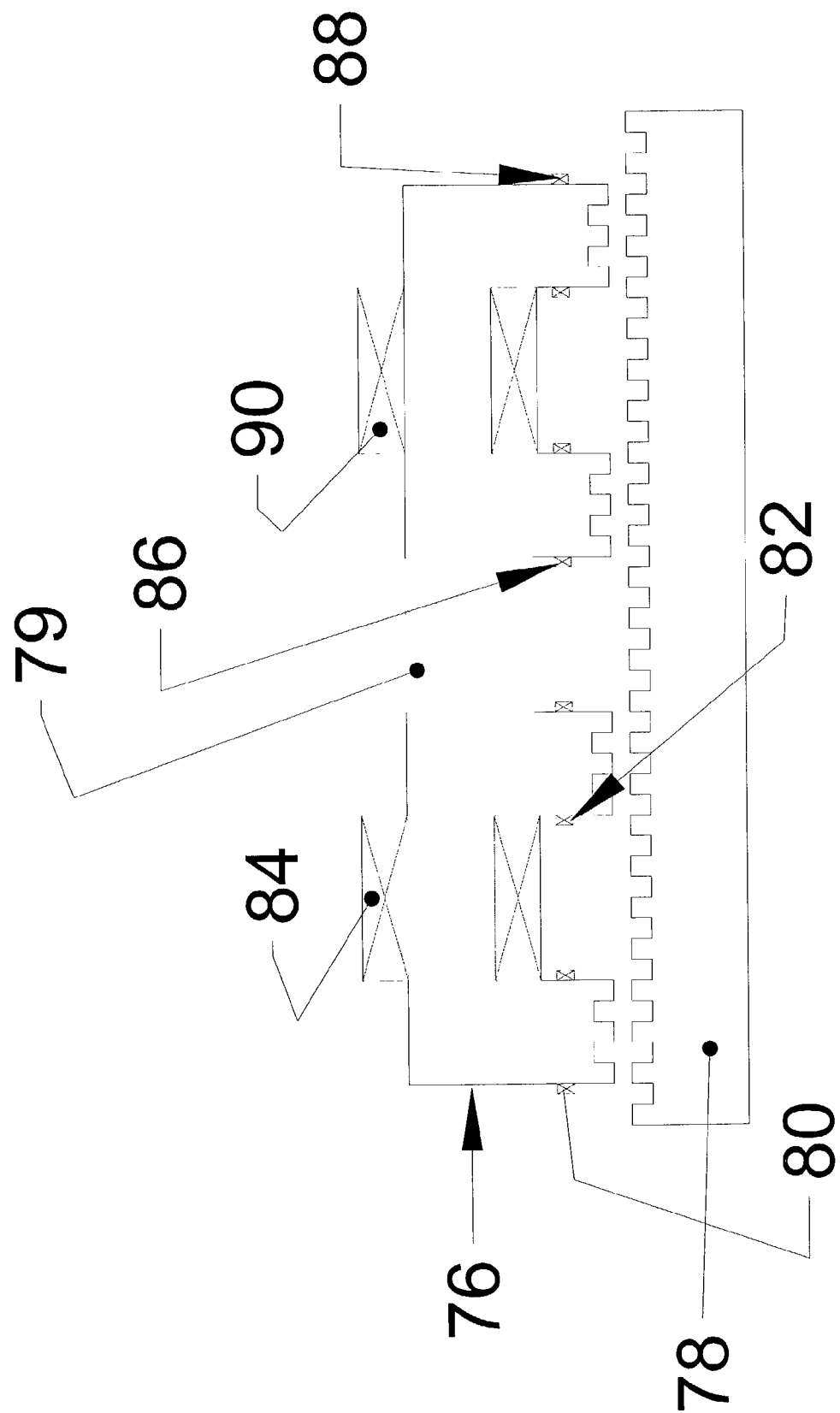
FIG. 9 illustrates a resolver in accordance with some aspects of the present invention in a linear configuration to provide position information for a linear motor.

FIG. 9 shows an implementation of the sensing strategy for a linear stepper motor having a forcer 76 disposed above a platen 78. A permanent magnet 79 is provided on the forcer 76. As is conventional in this discussion, the forcer has driving coils and can be driven to move with respect to the stationary platen 78. The opposite configuration is possible, with the stationary platen having driving coils. Referring to FIG. 9, sense coils 80 and 82 detect the AC field induced by drive coil 84. Similarly, sense coils 86 and 88 detect the field induced by drive coil 90. Sense coils may be connected independently or may be connected in series with the coils arranged in opposite sense to provide a differential measurement. The series opposition configuration is similar to the "figure 8" configuration used in the rotary format. The detection works in the same manner as for the linear motor. That is, in the illustrated position, sense coil 80 produces a maximum output due to the alignment of the teeth, while sense coil 82 produces a minimal output. Sense coils 86 and 88 have approximately equal outputs. As the forcer moves right to left with respect to the platen, the relative tooth alignments change, causing approximately sine and cosine variations in the envelope of the signals from the sensing coils associated with drive coil 84 and drive coil 90, respectively.

Figure 10:
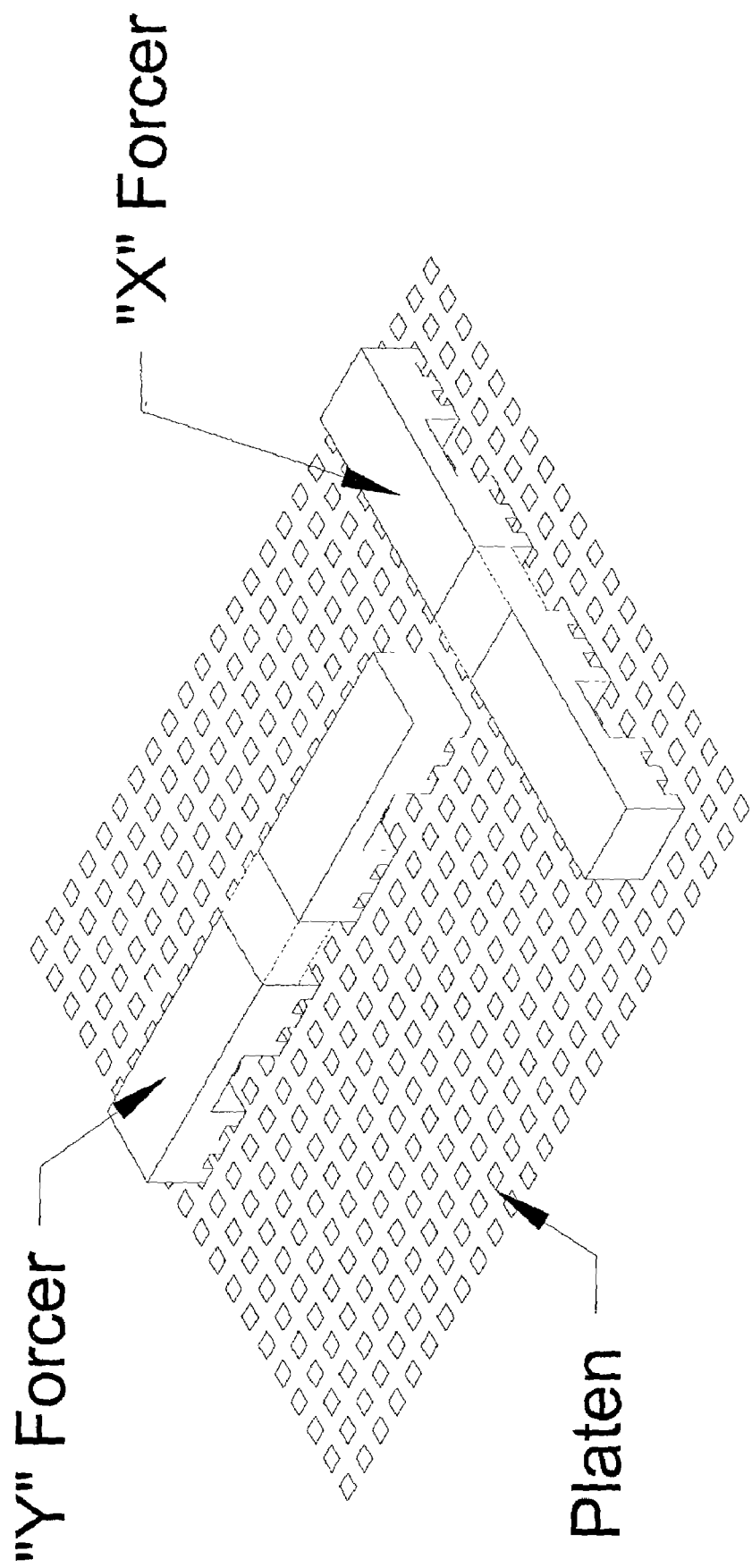
FIG. 10 illustrates an X-Y configuration including two linear motors with appropriate resolvers a linear configuration in accordance with some aspects of the present invention.

Referring now to FIG. 10, X and Y forcers are shown, but the carrier connecting the two forcers and the driving and sensing coils are not shown for simplicity. In an implementation of this device, the forcers and driving and sensing coils are implemented as in the integrated motor and resolver of FIG. 9. Only the ends of posts rising from the magnetically permeable steel platen base are shown on the top surface of the platen, although other configurations using alternating magnets for each of the posts have also been described. Such a platen typically is fashioned from high permeability steel and the gaps between the posts are filled with an epoxy. The top surface is ground smooth to allow the forcer to use an air bearing. This illustrated configuration is shown as a simple example of an X-Y configuration. Other implementations may use other configurations of forcers. For example, an implementation with four forcers might have the forcers arranged about the periphery of a rectangle.

The resulting position sensing system allows simple implementation of high positioning accuracy without significantly affecting the cost, size, weight, or temperature range of the sensed system while enabling the system to be run in true closed loop fashion.

Closed loop operation of motors, whether of the rotary or linear varieties, is generally preferred to provide greater accuracy and control to all of the operations of the motor. In closed loop applications, additional structures, commonly optical encoders, discrete resolvers, Hall effect sensors, etc., generally are attached to an end of the motor to provide position and phasing information. The use of the high pole count magnetic structures already present in this style of motor not only minimizes the size of the motor/feedback package, but also provides ready, largely automatic alignment of the motor and resolver phases. Use of the integrated resolver described here can eliminate the rotary transformer typical of most resolver designs. An additional benefit of the high pole count motor is the high number of sinusoid cycles generated per mechanical revolution of the motor, which provides a high overall position resolution even with relatively simple signal processing.

The same sensor may be used as a variable reluctance sensor with relative ease if there is a need to have the motor driver disabled. Such a variable reluctance configuration allows at least coarse sensing of position until the driver coils of the motor are activated.

Figure 11:
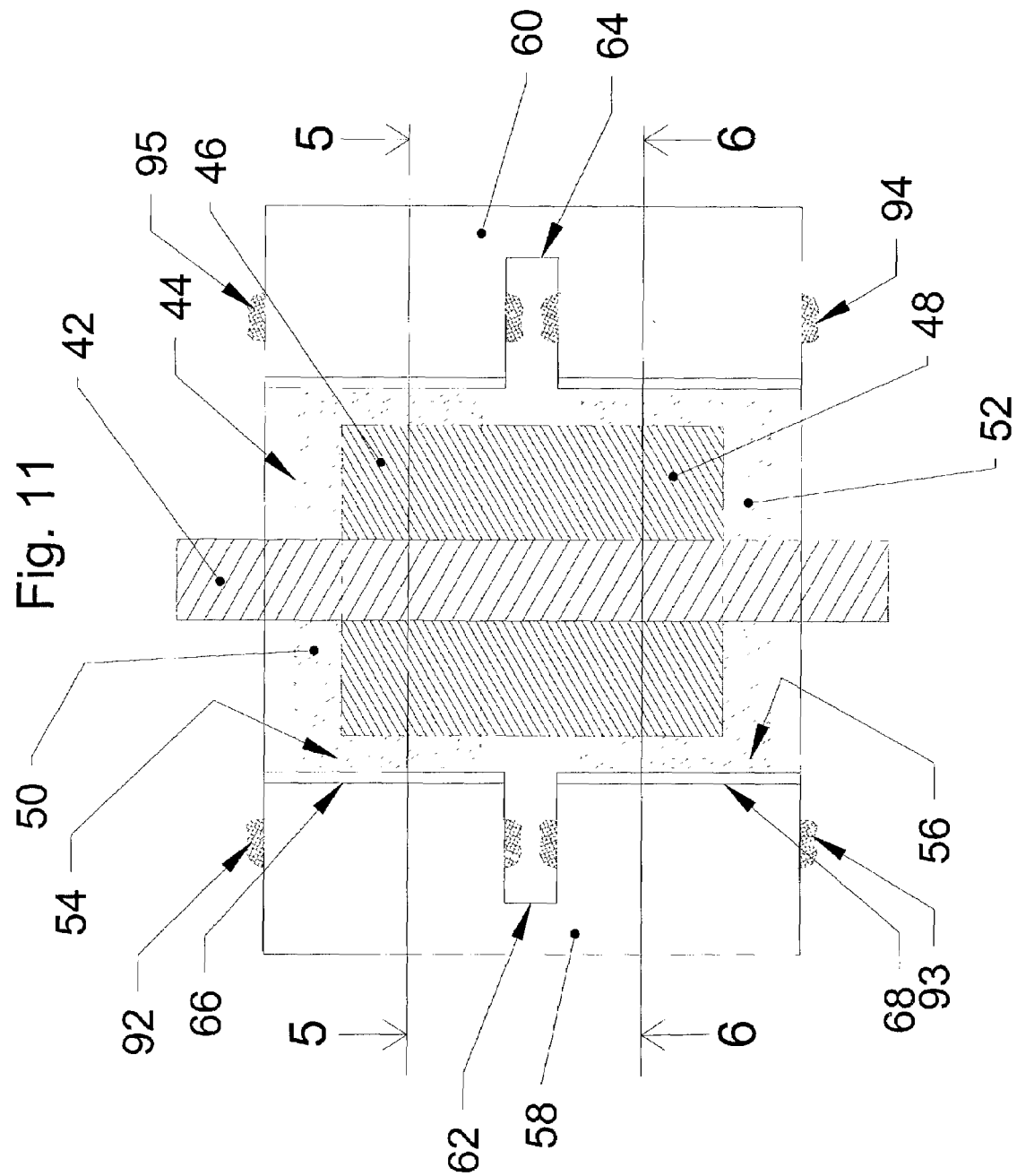
FIG. 11 shows a cross section through a variation of the rotary, high pole count, synchronous motor shown in FIG. 4.

Another variation of the integrated motor and resolver is illustrated generally in FIG. 11. In the FIG. 11 illustration, most of the structures are similar to those illustrated in FIGS. 4–6. The illustrated motor uses split stator pole pieces, with each pole piece preferably separately wound with drive coils 92, 93, 94 and 95. The gaps 62 between the pole pieces are similar to the FIG. 4 gaps, but deeper. The rotor pole caps and stator pole pieces for the FIG. 11 motor can be arranged like those of the FIG. 4 motor. The sensing coils can be wound around the two pole piece halves or, alternatively, the reluctance variations can be sensed directly by bringing out both ends of each drive coils (either 4 wires or center tapped). Additionally, the windings of two different pole pieces associated with one phase could be wired in a bridge configuration to sense this reluctance/inductance change as a function of position. Again, differential calculations based on two closely spaced readings about a voltage switching point could be used to reduce unwanted signal components, including winding resistance effects, while increasing the amplitude of the wanted signal.

It should be noted that nothing about the present position sensing method and apparatus requires that the sensing method or apparatus be used exclusively in detecting a motor position, velocity or acceleration. Nothing here is incompatible with using the method and apparatus in conjunction with encoders, including optical encoders, and in conjunction with a conventional resolver. Applications where it might be useful to include multiple sensing strategies may exist and, given the potential low costs of implementing the system described here, it is possible to do so at costs similar to systems using only an encoder or using only a resolver. Nevertheless, the system described here can be implemented at sufficiently low cost and with sufficient accuracy to provide the sole positioning information for a wide range of systems including closed loop control systems.

Because of the nature of the signals available using this sensing method and the ease with which these signals can be processed, the sensing method or apparatus can provide position information, velocity information or acceleration information about the motor. For the purposes of this disclosure and the claims, all of these characteristics can be identified collectively as position measurements or information.

The preceding discussions have referenced teeth as components of the rotors and stators of motors. In many instances these teeth are physically exposed as shown in the drawings, with air gaps surrounding the metal teeth. Other configurations are known. For example, the gaps between the teeth of a motor, whether rotary or other, can be filled with a non-magnetic compound. In such a configuration, the teeth are clearly those outwardly extending portions of the rotor and/or stator that are functional in the magnetic coupling. In other configurations, the spaces between the magnetic teeth can be filled with permanent magnet elements to enhance the torque of the motor. In such other configurations, the teeth remain readily identifiable as the portions of the rotor or stator that are functional in the varying magnetic coupling between portions of the rotor and portions of the stator.

While the most apparent applications of the present invention will be in closed loop servomotors, open loop applications are readily implemented and could be advantageous, depending on the particular circumstances.

The present invention has been described in terms of certain preferred embodiments thereof. Those of ordinary skill in the art will appreciate that various modifications might be made to the embodiments described here without varying from the basic teachings of the present invention. Consequently the present invention is not to be limited to the particularly described embodiments but instead is to be construed according to the claims, which follow.

I claim:

1. An integrated motor- and position sensor comprising:
   a linear motor comprising a platen assembly including a planar portion having a plurality of evenly spaced linearly projected teeth, and a forcer assembly planarly spaced from the platen assembly and having a plurality of linearly projecting forcer poles, the forcer poles each having a plurality of forcer teeth projecting parallel to the platen teeth,
   coils for electrically energizing the forcer poles, the coils adapted to generate driving magnetic flux in response to driving current provided to the coils, the driving magnetic flux generating force between the platen assembly and the forcer assembly, and
   a plurality of sensing coils placed to intercept at least a portion of the driving magnetic flux between a plurality of the forcer poles and a plurality of platen teeth, the plurality of sensing coils generating an output sensing coil signal responsive to the driving magnetic flux and the relative position or movement between the platen assembly and the forcer assembly.

2. A motor having an integrated position sensor, comprising:
   a motor having at least one movable portion that is movable by a magnetic field of the motor, the magnetic field generated at least in part by driving coils adapted to generate driving magnetic flux in response to driving current provided to the coils; and
   a sensor capable of sensing a position or change in position of the at least one movable portion of the motor with respect to a stationary portion of the motor, wherein the sensing occurs by detecting a portion of the driving magnetic flux responsive to the driving current and used to position the moveable portion of the motor wherein the sensor comprises a plurality of sensing coils placed to intercept at least a portion of the driving magnetic flux, the plurality of sensing coils positioned to couple to the driving magnetic flux and generate an output sensing coil signal responsive to relative position, velocity or acceleration of the at least one movable portion.

3. The motor of claim 1, wherein the sensing coils detect the relative position in the absence of movement between the platen assembly and the forcer assembly.

4. The motor of claim 2, wherein the sensor detects the position of the movable part of the motor in the absence of motor motion.

5. The motor of claim 1, wherein the output sensing coil signal comprises an AC chopping signal.

6. The motor of claim 2, wherein the sensing utilizes an AC chopping effect.

* * * * *